(12) United States Patent
Curt et al.

(10) Patent No.: US 12,449,451 B2
(45) Date of Patent: Oct. 21, 2025

(54) ELECTRIC POWER DATA COLLECTION AND ANALYSIS SYSTEM AND PROCESS OF IMPLEMENTING THE SAME

(71) Applicant: Power Monitors, Inc., Mt. Crawford, VA (US)

(72) Inventors: Walter Morgan Curt, Mt. Crawford, VA (US); Christopher Fisher Mullins, Mt. Crawford, VA (US)

(73) Assignee: Power Monitors, Inc., Mt. Crawford, VA (US)

( * ) Notice: Subject to any disclaimer, the term of this patent is extended or adjusted under 35 U.S.C. 154(b) by 17 days.

(21) Appl. No.: 17/566,864

(22) Filed: Dec. 31, 2021

(65) Prior Publication Data

US 2022/0206047 A1 Jun. 30, 2022

Related U.S. Application Data

(60) Provisional application No. 63/132,746, filed on Dec. 31, 2020.

(51) Int. Cl.
*G01R 21/133* (2006.01)

(52) U.S. Cl.
CPC ................ *G01R 21/133* (2013.01)

(58) Field of Classification Search
None
See application file for complete search history.

(56) References Cited

U.S. PATENT DOCUMENTS

| | | | | |
|---|---|---|---|---|
| 4,950,999 | A * | 8/1990 | Agnello | G01R 23/16 324/76.15 |
| 7,010,438 | B2 * | 3/2006 | Hancock | G01R 21/133 702/60 |
| 2006/0025961 | A1 * | 2/2006 | Appel | G05B 17/02 702/182 |
| 2014/0379156 | A1 * | 12/2014 | Kamel | G01R 21/133 700/291 |
| 2015/0276825 | A1 * | 10/2015 | Curt | G01R 19/2513 702/58 |
| 2017/0099357 | A1 * | 4/2017 | Haupt | H04L 67/12 |
| 2019/0311442 | A1 * | 10/2019 | Helsel | G06Q 10/06312 |

* cited by examiner

*Primary Examiner* — Eman A Alkafawi
*Assistant Examiner* — Joseph O Nyamogo
(74) *Attorney, Agent, or Firm* — BakerHostetler

(57) ABSTRACT

A data acquisition and collection device, process, and/or system is disclosed that may be coupled with optional cloud-based data collection and analysis features. This device, process, and/or system provides for the collection of large datasets from the electric power grid to feed into ML/AI training systems, and optionally provides a mechanism to apply new algorithms back to the device, process, and/or system to enhance data collection and triggering mechanisms.

16 Claims, 6 Drawing Sheets

ELECTRIC POWER DATA COLLECTION AND ANALYSIS SYSTEM AND PROCESS OF IMPLEMENTING THE SAME

CROSS-REFERENCE TO RELATED APPLICATIONS

This application claims the benefit of U.S. Provisional Application No. 63/132,746 filed on Dec. 31, 2020, which is hereby incorporated by reference in its entirety for all purposes as if fully set forth herein.

FIELD OF THE DISCLOSURE

The disclosure relates to an electric power data collection and analysis system. The disclosure also relates to a process of implementing an electric power data collection and analysis system. Additionally, the disclosure relates to an electric power data collection and analysis device. The disclosure also relates to a process of implementing an electric power data collection and analysis device.

BACKGROUND OF THE DISCLOSURE

Machine Learning (ML) and Artificial Intelligence (AI) systems are being developed to analyze raw electrical power data, ultimately providing algorithms for real-time situational awareness, notification of impending instabilities, equipment failures, and/or the like and inputs into control systems to optimize power delivery and/or the like. These algorithms are trained with large quantities of raw data, gathered at many points in the electric power system.

Gathering this data is currently very difficult. Traditional utility equipment is designed compute and present aggregated measurements such as RMS (Root Mean Square) voltage, current, real power, and/or the like for use in control systems or long-term data logging. These metrics are aggregations of raw waveform samples, and typically hide information needed for deeper analytics. More advanced equipment may capture raw waveform information, but is typically limited in memory, designed to capture short data bursts based on trigger conditions. These devices are inherently unsuited for gathering raw data to feed new ML systems, AI systems, and/or the like since the data snapshots are limited to the length of a disturbance, and the triggering mechanism can only utilize existing metrics to trigger the snapshot.

Additionally, many potential data collection sites do not have sufficient connectivity to stream waveform data to a central server. One 3-phase circuit, with voltage and current sampling at 256 samples per cycle generates 14.8 GB per day of raw data. A typical monitoring point may have 12 or more 3 phase circuits (e.g. one per feeder). With 12 circuits, 178 GB/day of data is generated, or over 5000 TB/month. Streaming this data continuously requires a high speed, always-on network connection, unavailable at many points on the electric power grid.

The disclosure solves these problems with a novel data acquisition and collection device, system, and/or process coupled with optional cloud-based data collection and analysis features. The disclosed device, system, and/or process provides for the collection of large datasets from the electric power grid to feed into ML training systems, AI training systems, and/or the like and optionally provides a mechanism to apply new algorithms back to the disclosed device, system, and/or process to enhance data collection and triggering mechanisms.

SUMMARY OF THE DISCLOSURE

The foregoing needs are met, to a great extent, by the disclosure, wherein an electric power data collection and analysis system, a process of implementing an electric power data collection and analysis system, an electric power data collection and analysis device, and/or a process of implementing an electric power data collection and analysis device is provided.

One aspect includes an apparatus for electric power data collection and analysis includes: at least one transducer configured to measure an electrical parameter of a monitored element; one or more data collection units configured to collect data that includes at least the electrical parameter measured by the at least one transducer; and a data concentrator configured to receive periodic data blocks from the one or more data collection units that includes the data collected by the one or more data collection units, where the electrical parameter includes at least one of the following: voltage, current, and/or power.

One aspect includes a process for electric power data collection and analysis includes: measuring an electrical parameter of a monitored element with at least one transducer; collecting data with one or more data collection units that includes at least the electrical parameter measured by the at least one transducer; and receiving periodic data blocks from the one or more data collection units with a data concentrator that includes the data collected by the one or more data collection units, where the electrical parameter includes at least one of the following: voltage, current, and/or power.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
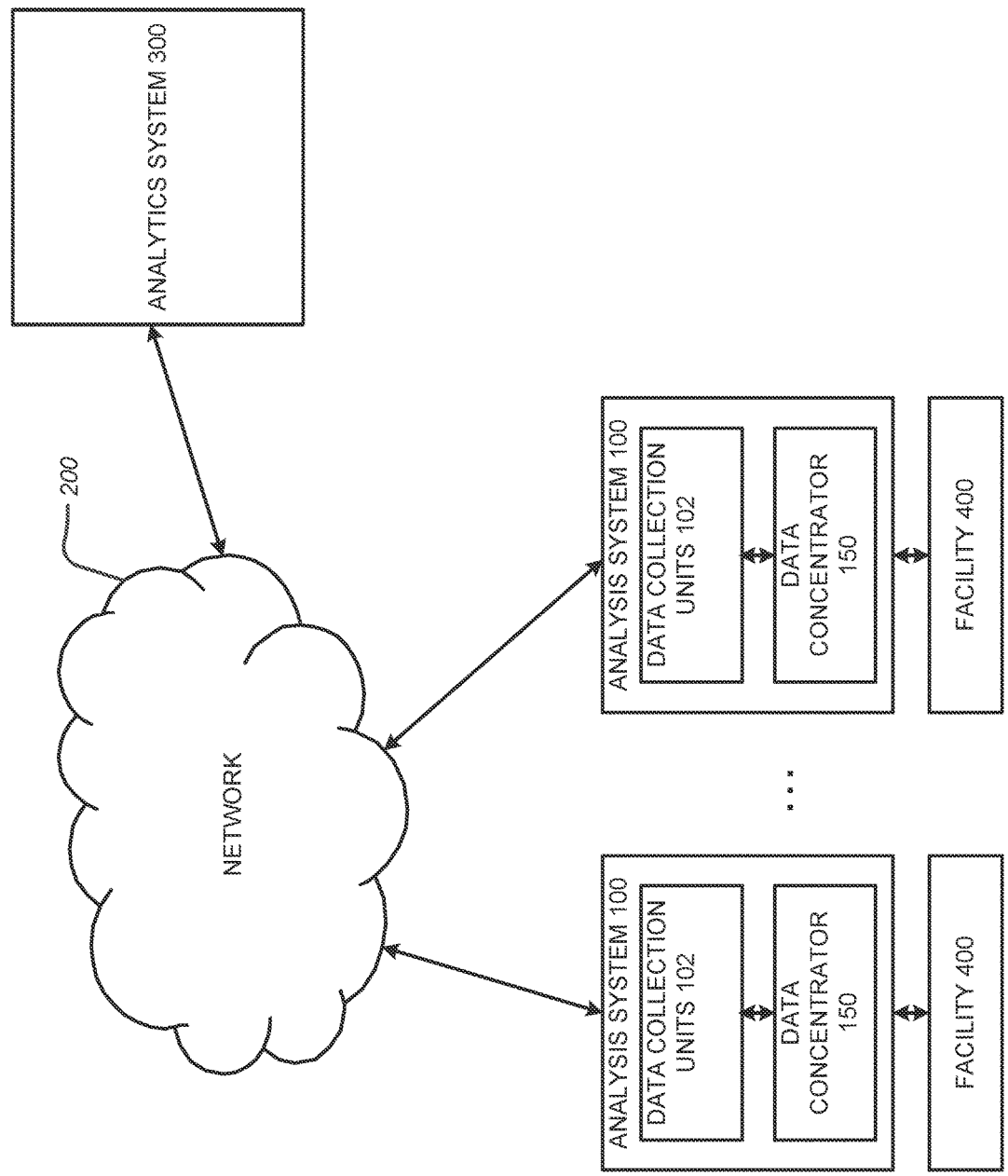
FIG. 1 illustrates a system according to aspects of the disclosure.

The disclosure will now be described with reference to the drawing figures, in which like reference numerals refer to like parts throughout. Aspects of the disclosure advantageously provide an electric power data collection and analysis system, a process of implementing an electric power data collection and analysis system, an electric power data collection and analysis device, and/or a process of implementing an electric power data collection and analysis device.

FIG. 1 illustrates a system according to aspects of the disclosure.

Figure 2:
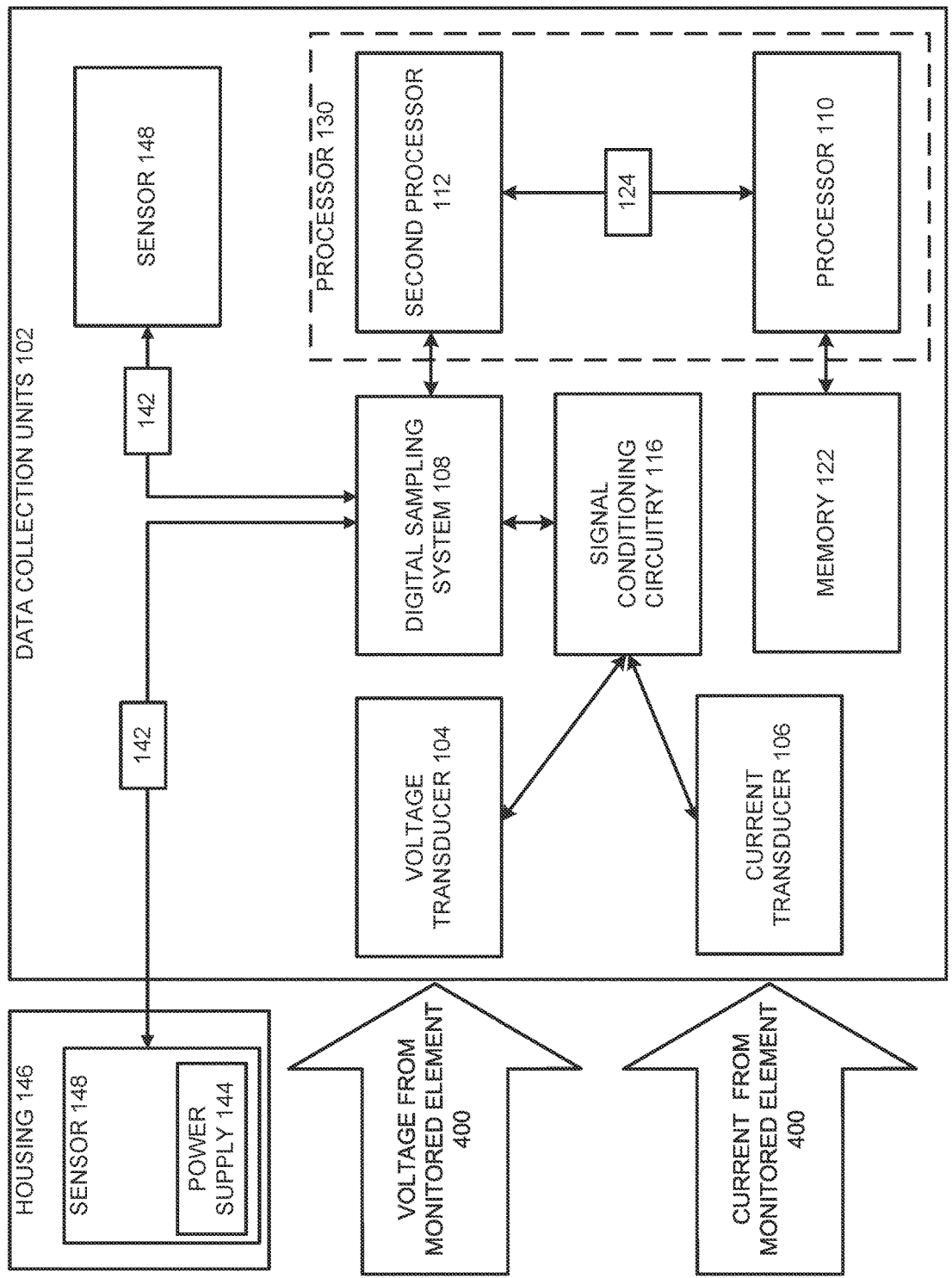
FIG. 2 illustrates a data collection unit according to aspects of the disclosure.

FIG. 2 illustrates a data collection unit according to aspects of the disclosure.

Figure 3:
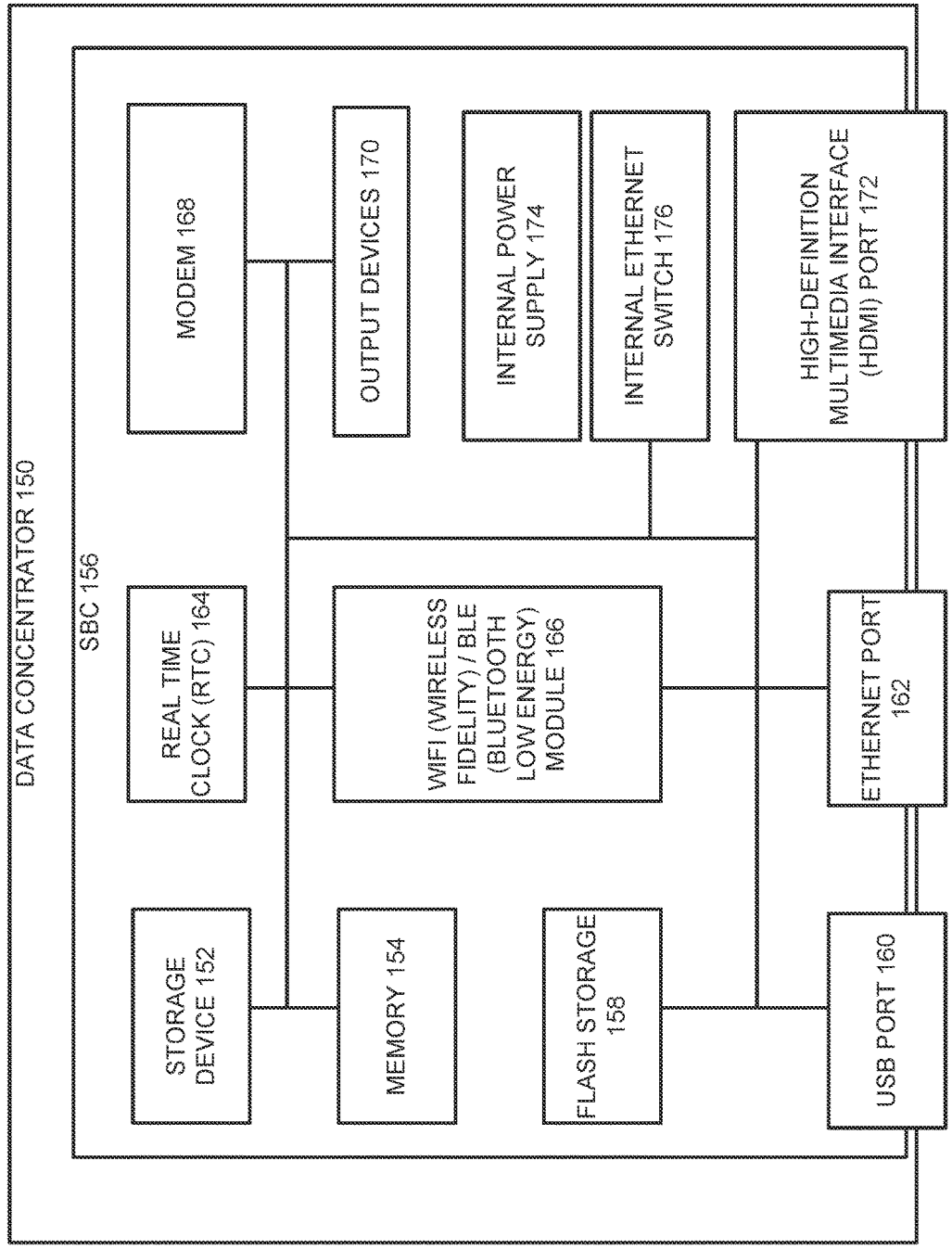
FIG. 3 illustrates a data concentrator according to aspects of the disclosure.

FIG. 3 illustrates a data concentrator according to aspects of the disclosure.

The disclosure is directed to an electric power data collection and analysis system 100. The electric power data collection and analysis system 100 is configured to collect and analyze power data for a monitored element 400. The monitored element 400 may be an electrical substation, a solar farm, a wind farm, a Distributed Energy Resource (DER), a portion of a utility transmission infrastructure, a portion of a utility generation infrastructure, one or more circuits, one or more machines, one or more components, and/or the like. The electric power data collection and analysis system 100 may include two core components. The first component may be implemented as one or more data collection units 102. In aspects, the one or more data collection units 102 may include at least one transducer configured to measure one or more electrical parameters associated with the monitored element 400 such as voltage, current, power, and/or the like. With reference to FIG. 2, the one or more data collection units 102 may include a voltage transducer 104, a current transducer 106, a sampling system 108 that may include an A/D (analog to digital) converter, and/or the like.

In aspects, the voltage transducer 104 may be configured to measure an electrical parameter such as a voltage associated with the monitored element 400. In this regard, the voltage transducer 104 may be configured with components, circuits, and/or the like for voltage measurement.

In aspects, the current transducer 106 may be configured to measure an electrical parameter such as a current associated with the monitored element 400. In this regard, the current transducer 106 may be configured with components, circuits, and/or the like for current measurement.

In aspects, the one or more data collection units 102 may include multiple implementations of the voltage transducer 104. In aspects, the one or more data collection units 102 may include multiple implementations of the current transducer 106. In aspects, the one or more data collection units 102 may include multiple implementations of the voltage transducer 104 and multiple implementations of the current transducer 106. In aspects, the one or more data collection units 102 may include one or more implementations of the voltage transducer 104 without any implementations of the current transducer 106. In aspects, the one or more data collection units 102 may include one or more implementations of the current transducer 106 without any implementations of the voltage transducer 104.

With further reference to FIG. 2, the one or more data collection units 102 may include at least one sensor 148 and/or may connect to at least one sensor 148. In aspects, the electric power data collection and analysis system 100, the data concentrator 150, and/or the like may include at least one sensor 148 and/or may connect to at least one sensor 148.

In aspects, the at least one sensor 148 may collect sensor readings and provide the sensor readings to the electric power data collection and analysis system 100, the one or more data collection units 102, the sampling system 108, signal conditioning circuitry 116, and/or the like. In particular, the at least one sensor 148 may be implemented as one or more of a temperature sensor, an air pressure sensor, a humidity sensor, a solar flux sensor, a vibration sensor, and/or the like.

In aspects, the sensor readings from the at least one sensor 148 may be useful for several reasons for monitoring the monitored element 400 such as implementations of the monitored element 400 associated with a utility. Additionally, the sensor readings from the at least one sensor 148 may be useful in the context of ML and analytics. In particular, the sensor readings from the at least one sensor 148 may provide more inputs into the electric power data collection and analysis system 100 for ML, analytics, and/or the like. In one aspect, a utility may implement the at least one sensor 148 outside the monitored element 400, and the monitored element 400 may be paired to the electric power data collection and analysis system 100, the one or more data collection units 102, the data concentrator 150, a similar component, and/or the like. The utility can use the environmental measurements provided by the at least one sensor 148 to help train ML algorithms, and/or the like to predict failures, provide system granularity, such as substation-level granularity, for storm tracking and/or the like. For example, this may help a utility predict where to deploy field crews as storms arrive to minimize outage durations.

The at least one sensor 148 may include a housing 146, a power supply 144, a wired or wireless connection 142, and/or the like. The housing 146 may be configured as an enclosure for protecting the at least one sensor 148, the power supply 144, the wired or wireless connection 142, and/or the like from the surrounding environment. The housing 146 may include various features to protect and provide access to the at least one sensor 148, the power supply 144, the wired or wireless connection 142, and/or the like. In one aspect, the housing 146 may include access features, such as a door, to access the at least one sensor 148, connections to the at least one sensor 148, the power supply 144, and/or the like. In aspects, the door may include a hinge structure to allow movement of the door as well as a mechanism to maintain the door in a closed position. Additionally, the housing 146 may include a sensor to monitor access to the housing 146 and/or the at least one sensor 148 and provide sensor outputs as part of the sensor readings. In aspects, the sensor may be a door closure sensor, a magnetic door closure sensor, and/or the like.

The power supply 144 may provide power to the at least one sensor 148 for sensor operation, the wired or wireless connection 142 for communication operation, and/or the like. In aspects, the power supply 144 may be implemented as a battery, a wired power connection to a separate power supply such as a power supply from the one or more data collection units 102, and/or the like. Battery implementations of the power supply 144 may be configured for long life. For example, battery implementations of the power supply 144 may be configured for up to 10 years of usage of the at least one sensor 148.

The wired or wireless connection 142 may be configured to receive the sensor readings from the at least one sensor 148 and provide the sensor readings to the electric power data collection and analysis system 100, the one or more data collection units 102, the sampling system 108, the signal conditioning circuitry 116, and/or the like. In one aspect, the wired or wireless connection 142 may include a Wi-Fi (wireless fidelity)/BLE (Bluetooth Low Energy) module that allows for connection to the electric power data collection and analysis system 100, the one or more data collection units 102, the sampling system 108, the signal conditioning circuitry 116, and/or the like.

The at least one sensor 148 may be implemented as a temperature sensor configured to measure an ambient temperature of the monitored element 400, the one or more data collection units 102, the electric power data collection and analysis system 100, an environment thereof, and/or the like. In aspects, implementation of the at least one sensor 148 as a temperature sensor may include implementations as a thermistor, a thermally sensitive resistor, a negative temperature coefficient (NTC) thermistor, a positive temperature coefficient (PTC) thermistor, a thermocouple, a resistance thermometer, a silicon bandgap temperature sensor, and/or the like.

The at least one sensor 148 may be implemented as an air pressure sensor configured to measure an ambient air pressure of the monitored element 400, the one or more data collection units 102, the electric power data collection and analysis system 100, an environment thereof, and/or the like. In aspects, implementation of the at least one sensor 148 as an air pressure sensor may include implementations as microelectromechanical system (MEMS) barometer, a piezoresistive pressure-sensing device, and/or the like.

The at least one sensor 148 may be implemented as a humidity sensor configured to measure an ambient humidity of the monitored element 400, the one or more data collection units 102, the electric power data collection and analysis system 100, an environment thereof, and/or the like. In aspects, implementation of the at least one sensor 148 as humidity sensor may include implementations as a capacitive hygrometer, a resistive hygrometer, a thermal hygrometer, a gravimetric hygrometer, optical hygrometer, and/or the like.

The at least one sensor 148 may be implemented as a solar flux sensor configured to measure an ambient solar flux in an environment of the monitored element 400, the one or more data collection units 102, the electric power data collection and analysis system 100, and/or the like. In aspects, implementation of the at least one sensor 148 as a solar flux sensor may include implementations as a photodiode, a thermopile pyranometer, photovoltaic pyranometer, a silicon photodiode, a photovoltaic cell, and/or the like.

The at least one sensor 148 may be implemented as a vibration sensor configured to measure an ambient vibration of the monitored element 400, the one or more data collection units 102, the electric power data collection and analysis system 100, an environment thereof, and/or the like. In aspects, implementation of the at least one sensor 148 as a vibration sensor may include implementations as a laser accelerometer, a piezoelectric accelerometer, a strain gauge accelerometer, a surface acoustic wave (SAW) accelerometer, a surface micromachined capacitive (MEMS) accelerometer, a potentiometric type accelerometer, and/or the like.

The at least one sensor 148 may be implemented as a wind speed and/or wind direction sensor configured to measure an ambient wind speed and/or wind direction in an environment of the monitored element 400, the one or more data collection units 102, the electric power data collection and analysis system 100, and/or the like. In aspects, implementation of the at least one sensor 148 as a wind speed and/or wind direction sensor may include implementations as an ultrasonic wind speed and/or wind direction sensor, a cup anemometer, a vane anemometer, a hot-wire anemometer, a laser doppler anemometer, an ultrasonic anemometer, an acoustic resonance anemometer, a ping-pong ball anemometer, a pressure anemometer, a plate anemometer, a tube anemometer, a pitot tube static anemometer, and/or the like. In aspects, implementation of the at least one sensor 148 as a wind speed and/or wind direction sensor may be configured without moving parts.

The at least one sensor 148 may be implemented as a rainfall/precipitation sensor configured to measure an ambient rainfall/precipitation in an environment of the monitored element 400, the one or more data collection units 102, the electric power data collection and analysis system 100, and/or the like. In aspects, implementation of the at least one sensor 148 as a rainfall/precipitation sensor may include implementations as an ultrasonic rain gauge, an acoustic rain gauge, an optical rain gauge, a weighing precipitation gauge, and/or the like. In aspects, implementation of the at least one sensor 148 as a rainfall/precipitation sensor may be configured without moving parts.

The at least one sensor 148 may be implemented to measure other environmental quantities, other physical quantities, and/or the like in an environment of the monitored element 400, the one or more data collection units 102, the electric power data collection and analysis system 100, and/or the like. In aspects, implementation of the at least one sensor 148 to measure other environmental quantities, other physical quantities, and/or the like may be configured without moving parts.

In aspects, the one or more data collection units 102 may include a processor 110, such as a DSP (digital signal processor). The processor 110 may be configured for data collection, pre-processing, analytic operations, and/or the like. The one or more data collection units 102 may include a second processor 112. The second processor 112 may be configured for data buffering, communication, and/or the like.

The second component of the electric power data collection and analysis system 100 may be a data concentrator 150. The data concentrator 150 may be configured to receive periodic data blocks and/or the like from the one or more data collection units 102. The data concentrator 150 may be configured to receive raw waveform data and/or other data from the one or more data collection units 102. Additionally, the data concentrator 150 may be configured to provide timestamps, compress the data in a format suitable for storage, store the data in an organized fashion for later retrieval, and/or the like.

In aspects, the data concentrator 150 may be configured to send the data over a network 200 on a communication channel as defined herein to a data lake or a cloud-based analytics system 300. With reference to FIG. 3, if the data concentrator 150 is not connected to the network 200, the data concentrator 150 may be configured to continue to accumulate the data locally in compressed format, periodically transfer the data to a storage device 152, such as a removable storage device. In one or more aspects, the storage device 152 may be implemented as a removable Universal Serial Bus (USB) Flash drive. In this regard, the storage device 152 implemented as a removable Universal Serial Bus (USB) Flash drive may be implemented as a data storage device that includes flash memory with an integrated USB interface.

In this regard, the data concentrator 150 may be configured to allow a user to periodically physically swap the storage device 152. For example, the user may once a week, once a month, and/or the like physically swap the storage device 152. In this regard, the data concentrator 150 may be configured to store continuous waveform data from the monitored element 400 in compressed format. Accordingly, the storage device 152 removed from the data concentrator 150 may have the continuous waveform data from the monitored element 400 stored in the compressed format.

Additionally, the user may provide a replacement implementation of the storage device 152 to the data concentrator 150. In this regard, the replacement implementation of the storage device 152 may be a previously utilized implementation of the storage device 152 that has been previously utilized and the data stored thereon erased. Thereafter, the replacement implementation of the storage device 152 may be utilized by the data concentrator 150 for further data accumulation. For example, the replacement implementation of the storage device 152 may be utilized to store subsequent continuous waveform data from the monitored element 400 stored in the compressed format.

Figure 4:
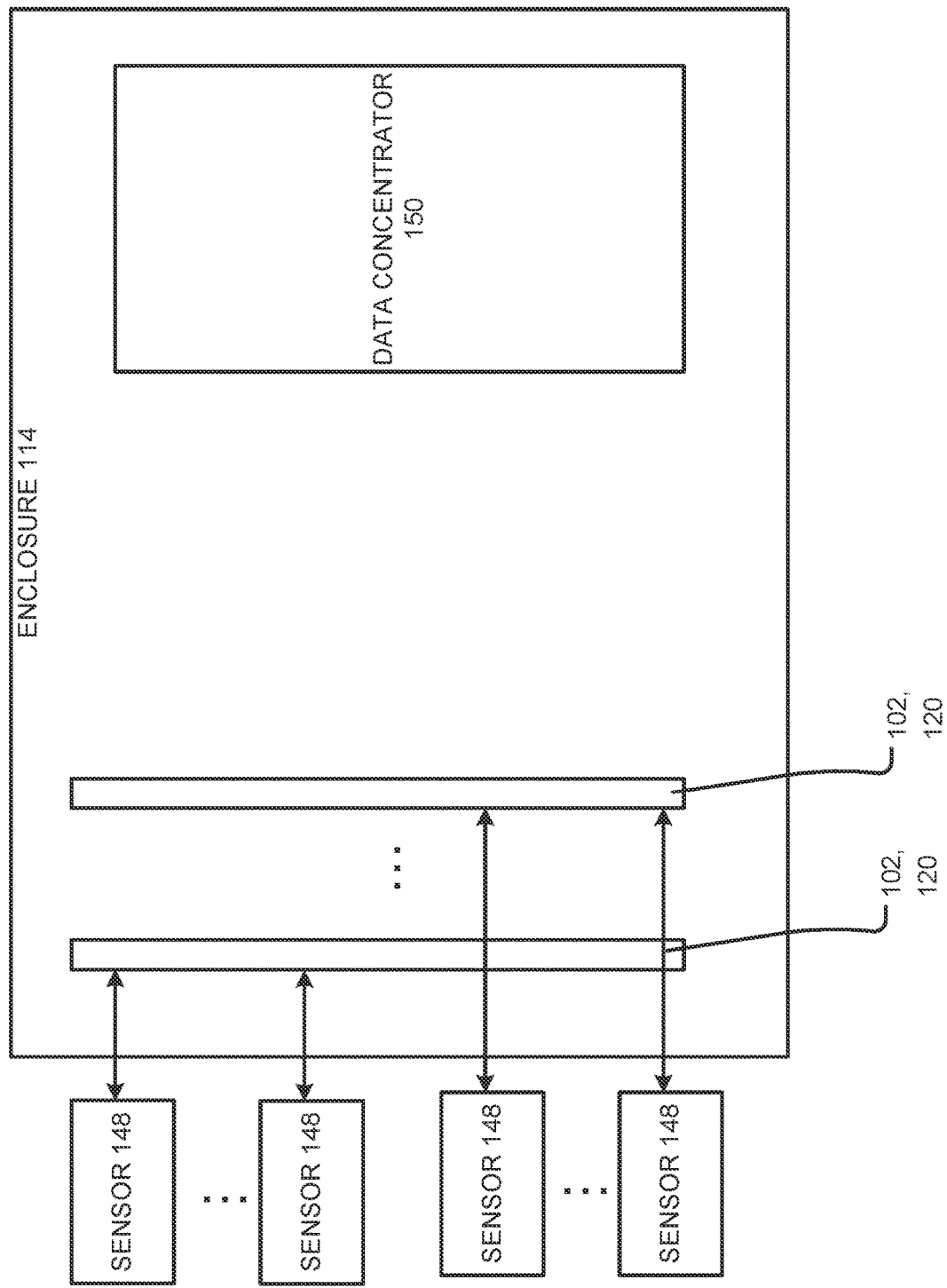
FIG. 4 illustrates further aspects of a data collection unit according to aspects of the disclosure.

FIG. 4 illustrates further aspects of a data collection unit according to aspects of the disclosure.

In aspects, the one or more data collection units 102 may be arranged in an enclosure 114. In aspects, the enclosure 114 may be a rack enclosure for the one or more data collection units 102. In aspects, the enclosure 114 may include one or more fastening systems, structural support systems, rails, cooling systems, and/or the like. In aspects, the enclosure 114 may hold card implementations 120 of the one or more data collection units 102.

For example, the enclosure 114 may be a standard 19" rack enclosure. In aspects, the enclosure 114 may be configured as a 2U enclosure containing a plurality of the card implementations 120 of the one or more data collection units 102. In aspects, the enclosure 114 may hold a plurality of the card implementations 120 of the one or more data collection units 102 implemented as 3-phase data collection units ("cards"). In aspects, the enclosure 114 may hold 12 individual configuration of the card implementations 120 of the one or more data collection units 102 implemented as 3-phase data collection units ("cards").

Each of the card implementations 120 of the one or more data collection units 102 may have connectorized inputs for a plurality of voltage signals, a CT (Current Transformer) connector for a plurality of current inputs, and/or the like. For example, each of the card implementations 120 of the one or more data collection units 102 may have connectorized inputs for 3 or 4 voltage signals, and a CT connector for 3 or 4 current inputs.

For example, a typical voltage input level may be 120 V RMS, from monitoring PTs (Potential Transformers) outside the electric power data collection and analysis system 100. In aspects, the electric power data collection and analysis system 100 and/or the card implementations 120 of the one or more data collection units 102 may accept inputs up to 300 V RMS or 600 V RMS.

In aspects, the electric power data collection and analysis system 100 and/or the card implementations 120 of the one or more data collection units 102 may be configured for current inputs that typically monitor 5 amps (A) metering CT secondaries. In aspects, the electric power data collection and analysis system 100 and/or the card implementations 120 of the one or more data collection units 102 may allow for various current ranges and CT assemblies, for use with 5 A metering CTs and also for cases where a main current (hundreds or thousands of amps) may be measured.

In aspects, the card implementations 120 of the one or more data collection units 102 may be a dual-processor system that may implement the processor 110 and the second processor 112. In aspects, the processor 110 may be implemented as a primary ARM (Advanced RISC Machine) processor. In aspects, the processor 110 may be implemented as a primary ARM processor running embedded Linux.

In aspects, the second processor 112 may be implemented as a secondary DSP processor. In aspects, the second processor 112 may be implemented as a secondary DSP processor handling data sampling, pre-processing, and/or the like.

The card implementations 120 of the one or more data collection units 102 may also include a high-speed A/D converter that may be implemented as part of the sampling system 108 and signal conditioning circuitry 116.

The card implementations 120 of the one or more data collection units 102 may be configured for data sampling. In aspects, the card implementations 120 of the one or more data collection units 102 may be configured for data sampling at 256 samples per 60 Hz cycle (15,360 Hz) per signal. Other sampling rates, such as lower sampling rates (as low as 64 samples per cycle) are possible in some configurations of the one or more data collection units 102. A higher sampling rate (such as 1 MHz) may be used to allow characterization of high frequency powerline noise signals, fast risetime transients, other high frequency signals that may be useful in machine learning training, and/or the like.

The A/D that may be implemented as part of the sampling system 108 may have any desired resolution. In aspects, the A/D that may be implemented as part of the sampling system 108 may have a resolution of at least 14 or 16 bits.

In aspects, the A/D that may be implemented as part of the sampling system 108 may implement oversampling techniques. The oversampling techniques may be used to trade off resolution and sampling rate. In one aspect, sampling by the A/D may be performed at 250 kHz with a 14 bit resolution, and the DSP implementation of the second processor 112 may downsample to 15,360 Hz with increased resolution. The downsampling performed by the DSP implementation of the second processor 112 may also incorporate phase locking so that the downsampled waveform may be synchronous to a 60 Hz reference signal (e.g. voltage channel one), even if the high speed raw data at 250 kHz is not synchronous. This may be accomplished by the DSP implementation of the second processor 112 utilizing continuous fast Fourier transform (FFT) analysis of the reference signal, and tracking the 60 Hz phase information, then adjusting the downsampled rate accordingly.

The one or more data collection units 102 may be configured such that voltage inputs and current inputs may be sampled simultaneously. Alternatively, the one or more data collection units 102 may be configured such that voltage inputs and current inputs may be sampled serially with signal pre-processing applied later if needed to re-align the signals.

Each of the card implementations 120 of the one or more data collection units 102 may individually phase lock to its channel one voltage signal (or another reference channel on the card). In aspects, the card implementations 120 of the one or more data collection units 102 may synchronize sampling to a primary card via digital sync connection, to an external timebase via a global navigation satellite system (GNSS), such as the Global Positioning System (GPS), which may implement one pulse per second input, IRIG-B input (Inter-range instrumentation group timecodes), IEEE-1588 timing, and/or the like. In aspects, the electric power data collection and analysis system 100 and/or a component of the electric power data collection and analysis system 100 may include a device to receive signals from a GNSS, such as GPS.

In aspects, the voltage inputs on the card implementations 120 of the one or more data collection units 102 may have a single common voltage reference. In aspects, each of the card implementations 120 of the one or more data collection units 102 may have has its own reference input. In aspects, the card implementations 120 of the one or more data collection units 102 may be configured for voltage inputs that may be fully differential.

The second processor 112 may be configured to collect continuous waveform data from the inputs. In aspects, the second processor 112 may be configured to collect the sensor readings from the at least one sensor 148. Additionally, the second processor 112 may apply pre-processing to the continuous waveform data and/or the sensor readings from the at least one sensor 148. The preprocessing implemented by the second processor 112 may include scaling, timing adjustments, downsampling, and/or the like to the continuous waveform data and/or the sensor readings from the at least one sensor 148. Further, the second processor 112 may buffer data in a memory 122 that may include the continuous waveform data and/or the sensor readings from the at least one sensor 148.

The second processor 112 may be configured to transfer data to other components within the card implementations 120 of the one or more data collection units 102. For example, the second processor 112 may be configured to transfer data to the processor 110. In particular, the second processor 112 may periodically transfer a batch of continuous data to the processor 110 that may include the continuous waveform data and/or the sensor readings from the at least one sensor 148. In this regard, periodically can be for example an n number of 60 Hz cycles, such as every one or two 60 Hz cycles. In one aspect, the second processor 112 may be configured to transfer data to the processor 110 over a bus 124, which may be a local bus, a local Serial Peripheral Interface (SPI) bus, and/or the like.

The processor 110, which may be running embedded Linux, receives this buffer or transfer data from the second processor 112 and the processor 110 adds the transfer data to its accumulation data in the memory 122 or another memory. After accumulating sufficient data (typically 10 seconds worth), the processor 110 may transfer this data to the data concentrator 150 via a connection between the data concentrator 150 and the one or more data collection units 102. The connection between the data concentrator 150 and the one or more data collection units 102 may be implemented by a local Ethernet connection and/or the like.

Although the primary purpose of the card implementations 120 of the one or more data collection units 102 is to capture and send data, such as continuous voltage waveform data, current waveform data, data that includes the sensor readings from the at least one sensor 148, and/or the like to the data concentrator 150, the one or more data collection units 102 may be configured for other tasks. In some aspects, the second processor 112 and the processor 110 together may provide full power quality monitoring, triggering, and/or the like including standard PQ (Power Quality) metrics such as IEEE 1453 flicker, harmonic measurements as per IEEE 519, and/or the like. In addition, the second processor 112 may also compute other derivative signals that may be useful, such as phasor measurement unit (PMU) data, that may be accumulated in the same manner as the raw voltage and current waveforms.

The electric power data collection and analysis system 100, the processor 110, and/or the second processor 112 may also be configured as an engine to execute AI/ML algorithms, data filtering, and/or the like. Additionally, these and other processes may be downloaded with future updates. These algorithms may be configured and used for predictive analytics to indicate impending powerline or equipment failures, detect system stability issues, flag equipment problems (e.g. capacitor banks not switching correctly, blown fuses, etc.) help identify the location of problems, and/or the like. Additionally, these algorithms may also be configured and used to filter out harmless disturbances such as mains signaling, timing pulses, and/or the like.

The processor 110 on the collection card may be connected to the data concentrator 150 via wired or wireless connection such as an Ethernet connection. An internal subnet inside the electric power data collection and analysis system 100 may connect all data cards to the data concentrator 150. In an aspect, each collection card has a unique slot number and internal IP address. After collecting data from the second processor 112 over a suitable time period (e.g. 10 seconds), the data may be sent from the processor 110 to the data concentrator 150 via standard User Datagram Protocol (UDP) link, a Transmission Control Protocol (TCP) link, and/or the like. The processor 110 may handle other housekeeping tasks such as maintaining card calibration and configuration information, detecting the connection and removal of current clamps, and/or the like. In one aspect, the processor 110 may also record and store standard power quality information in a local memory storage, such as the memory 122. In other aspects, one or more of the features, functionality, and/or the like of the processor 110 may be implemented by the second processor 112; and/or one or more of the features, functionality, and/or the like of the second processor 112 may be implemented by the processor 110.

In other aspects, the features, functionality, and/or the like of the processor 110 and the second processor 112 may be combined and implemented in a single processor or additional processors. In one aspect, the features, functionality, and/or the like of the processor 110 and the second processor 112 may be combined and implemented in a processor 130 as illustrated by dashing in FIG. 2.

In an aspect, the data concentrator 150 may be implemented as and/or may include an x86 Single Board Computer (SBC), hereinafter an SBC 156. For example, the SBC 156 may be implemented as an Odyssey X86J4105864 running Linux.

The SBC 156 may have a plurality of Ethernet ports, for example the SBC 156 may have two Ethernet ports, one dedicated to the Ethernet switch 176, such as an internal 16 port Ethernet switch that also connects to the collection cards; and one brought to the front panel for debugging and local user connection. The SBC 156 may have 2 TB or more of local Flash storage 158 to collect data if no external storage is available. The SBC 156 may have a USB port 160, such as a USB 3.0 port, that may be exposed at a front panel for a user to insert a high capacity USB Flash drive (typically 1 TB or more), such as the storage device 152. In normal operation, data may be received by the storage device 152 from the card implementations 120 of the one or more data collection units 102 periodically, for example every 10 seconds. The data may be formatted and stored in accumulating files on the local Flash storage 158. If a USB Flash drive is present, such as the storage device 152, this data may be periodically, for example once an hour, copied to that Flash drive, and erased from the local storage. If the USB Flash drive is full, or missing, data may continue to be accumulated on local storage, such as a memory 154, the local Flash storage 158, and/or the like until an empty Flash drive appears.

In one aspect, the SBC 156 may have a second Ethernet port 162 that may be exposed at the front panel of the data concentrator 150. If the second Ethernet port 162 is connected to local area network (LAN), such as a high speed LAN, waveform data and/or the sensor readings from the at least one sensor 148 may be transferred directly from the SBC 156 to the cloud-based analytics system 300, in addition to or in lieu of storage on the memory 154, the local Flash storage 158, and/or the like. The second Ethernet port 162 may also be used for IEEE 1588 time synchronization, remote device management, other cloud-based data analytics connections, and/or the like.

The SBC 156 may implement a real time clock (RTC) 164 that may be configured to keep local time, preferably with a battery backup. The second Ethernet port 162 may also be used for connection to a time server for synchronization.

In one aspect, the SBC 156 may include a Wi-Fi (wireless fidelity)/BLE (Bluetooth Low Energy) module 166 that allows for connection to a local LAN via Wi-Fi, and local wireless management of the device through BLE using a smartphone application, a tablet application, and/or the like. The SBC 156 may be configured to allow spot checks of waveform data, configuration, other management tasks, and/or the like, which may be completed through the BLE link.

In one aspect, the SBC 156 may include a modem 168, such as an embedded LTE modem. The modem 168 may be implemented as the Quectel EM06-A, a CAT 6 high speed modem, and/or the like. In some areas, this LTE connection may be fast enough to stream some or all continuous waveform data and/or the sensor readings from the at least one sensor 148 from the data concentrator 150 to the cloud-based analytics system 300. The modem 168 may also be used in the same manner as the second Ethernet port 162, for remote device management of the electric power data collection and analysis system 100, the one or more data collection units 102, the data concentrator 150, and/or the like.

The SBC 156 may include output devices 170. The output devices 170 may include LED status lights from the SBC 156 on the front panel to indicate device status, readiness of the USB external drive, and/or the like. In some aspects, the output devices 170 may be implemented as a front panel LCD display that may be used for presenting more information. The SBC 156 may include High-Definition Multimedia Interface (HDMI) port 172, which may also be exposed at the front panel in some embodiments. In other aspects, the features, functionality, and/or the like of the SBC 156 may be implemented in additional processors, additional computers, and/or the like.

In one aspect, the data concentrator 150 may include an internal power supply 174. The internal power supply 174 may take 120 VAC power and provide isolated low voltage supplies, for example 12 VDC and 5 VDC, for the SBC 156, the card implementations 120 of the one or more data collection units 102, the Ethernet switch 176, a cooling fan, and/or the like. In one aspect, the data concentrator 150 may include a rack-mounted 120 V uninterruptible power source (UPS) configured to provide backup power if needed.

In one aspect, the electric power data collection and analysis system 100, the one or more data collection units 102, the data concentrator 150 and/or the like may be adjacent the monitored element 400. The monitored element 400 may be an electrical substation, a solar farm, a wind farm, a Distributed Energy Resource (DER), a portion of a utility transmission infrastructure, a portion of a utility generation infrastructure, one or more circuits, one or more machines, one or more components, and/or the like.

The electric power data collection and analysis system 100, the one or more data collection units 102, the data concentrator 150, and/or the like may be configured as an installation. The installation may include the enclosure 114. In aspects, the installation may include mounting one or more components of the electric power data collection and analysis system 100, the one or more data collection units 102, the data concentrator 150, and/or the like in a rack, such as a standard 19 inch rack. Additionally, the installation may include the voltage input connections and current input connections to the monitored element 400 to be monitored, and applying 120 V power. A blank configuration of the memory 154, such as 1 TB USB drive, may be inserted in the front panel of the data concentrator 150, and upon power up, the electric power data collection and analysis system 100, the one or more data collection units 102, the data concentrator 150, and/or the like will begin collecting data from the monitored element 400. With a typical 12 circuit configuration the memory 154 may be full in 1-2 weeks. If there is no wired or wireless connection, such as a LAN connection, a user will come to the electric power data collection and analysis system 100 to swap USB drives. The electric power data collection and analysis system 100 may implement larger drives to reduce the number of on-site visits.

If a low-speed wired or wireless connection is available, for example a low data rate cell, a limited LAN connectivity via Ethernet, and/or the like, a subset of recorded data by the electric power data collection and analysis system 100 may be streamed off-site, in parallel with the local drive recording mechanism.

In one or more aspects, the data concentrator 150 may present a web interface on any exposed network port, a cell connection, the second Ethernet port 162, via Wi-Fi, and/or the like.

In some embodiments or use cases, the electric power data collection and analysis system 100 may be configured to provide a differing number of voltage and current channels. For example, in situations with multiple circuits that share a common voltage bus, a single three phase voltage input may suffice for all circuits, but each circuit has its own three phase current signals. The electric power data collection and analysis system 100 may be configurable to enable or disable voltage and current channels as needed to avoid storing redundant data. If only one voltage circuit is needed, individual implementations of the card implementations 120 of the one or more data collection units 102 may all synchronize to that common voltage input, without need to record redundant voltage inputs. Alternatively, the data the card implementations 120 of the one or more data collection units 102 may synchronize to their own current inputs, to an external timing pulse (e.g. from GPS, IRIG-B, or IEEE 1588 as described above), and/or the like.

For large systems, multiple implementations of the electric power data collection and analysis system 100 may be placed in the same rack. The second Ethernet port 162 may be used to connect the multiple implementations of the electric power data collection and analysis system 100 together to form a small network—e.g. to share a common LAN connection, share timing synchronization, or share a common large storage pool.

In one aspect, the SBC 156, the data concentrator 150, the card implementations 120 of the one or more data collection units 102 may all be contained in a single 19 inch rack enclosure, interconnected via internal Ethernet connections with a multi-port switch. In other embodiments the components may be distributed. For example, data the card implementations 120 of the one or more data collection units 102 may be standalone units with integral power supply, or the data concentrator 150 may be a separate rack mounted server or other networked device. A hybrid implementation is also possible, with an SBC in the standard rack configuration with the card implementations 120 of the one or more data collection units 102 also receiving data from external devices via the second Ethernet port 162. In some implementations, a PQ monitor such as the Power Monitor, Inc. (PMI) Seeker, Revolution, Tensor, or other networked device may act as a data collection card, feeding data to the data concentrator 150. In this configuration, the Seeker or other device may incorporate its own GPS timing synchronization, or utilize timing signals via wireless or wired connection from the data concentrator 150, or other available timing reference. Another possible embodiment is a virtual concentrator implementation of the data concentrator 150, with data collection devices streaming data through a network, a cellular data connection, a communication channel as defined herein, and/or the like to the cloud-based analytics system 300, a cloud-based receiver, and/or the like. This virtual concentrator implementation of the data concentrator 150 may be a virtual machine on a hosted system, a scalable system, such as Amazon Web Services (AWS), and/or the like.

The basic data collection system may include the card implementations 120 of the one or more data collection units 102 and the data concentrator 150, gathering raw bulk waveform data and/or the sensor readings from the at least one sensor 148 needed for ML/AI training. In a more advanced embodiment, the waveform data and/or the sensor readings from the at least one sensor 148 may be periodically fed into the ML/AI system, the cloud-based analytics system 300, and/or the like, which may use this data, possibly in combination with outside information, data, measurements, and/or the like such as known system device operation (e.g. reclosers, circuit breakers, and/or the like), equipment failures, and/or the like. In aspects, the electric power data collection and analysis system 100 and/or a component of the electric power data collection and analysis system 100 may collect the outside information, data, measurements, and/or the like consistent with the collection of the waveform data.

The waveform data, the sensor readings from the at least one sensor 148, the outside information, data, measurements, and/or the like may be utilized to train the ML/AI system, the cloud-based analytics system 300, and/or the like to create waveform signatures, train one or more neural networks, generate one or more algorithms, and/or the like that may be utilized to predict future events. These waveform signatures, one or more neural networks, one or more algorithms, and/or the like may be loaded onto a device, the electric power data collection and analysis system 100, the cloud-based analytics system 300, and/or the like either manually, or automatically. The device, the electric power data collection and analysis system 100, the cloud-based analytics system 300, and/or the like may implement these waveform signatures, one or more neural networks, one or more algorithms, and/or the like to create alerts when these patterns are detected. In aspects, the waveform signatures, one or more neural networks, one or more algorithms may be generated, trained, implemented, and/or the like utilizing artificial intelligence and/or machine learning as defined herein. The alerts may be transferred to the SBC 156 and upstream to the cloud-based analytics system 300, a cloud-based, and/or other system to send email notifications, SMS notifications, Supervisory Control And Data Acquisition (SCADA) notifications, and/or other notifications as needed.

The electric power data collection and analysis system 100 and/or the cloud-based analytics system 300 may also be connected to a SCADA system via Distributed Network Protocol 3 (DNP3), MODBUS, IEC 61850, and/or other protocol. It can operate as a SCADA remote terminal unit (RTU), making data collection card data available to a SCADA master, and sending unsolicited reports by exception. In most cases, raw waveform data would not be suitable for SCADA transfer, rather the SBC 156 would send aggregate measures from the card implementations 120 of the one or more data collection units 102 such as RMS voltage, current, real power, harmonic distortion, and/or the like. In some embodiments, the card implementations 120 of the one or more data collection units 102 or the SBC 156 may have relay or digital inputs and outputs controllable by the SCADA system, to facilitate SCADA switching or operation of external devices such as relays, contactors, breakers, and/or the like, in parallel with the devices primary function as a data collection system.

In some embodiments, a networked device may send periodic data to a cloud based system such as PMI's PQ Canvass system. Some or all of the collected data may be presented to the user via the web interface of the cloud system, either as raw waveforms, or as computed PQ information.

In one or more aspects, the electric power data collection and analysis system 100, the one or more data collection units 102, the data concentrator 150, and/or the like may include communication ports for interfacing with external sensors. The communication ports may be implemented utilizing any known technology including RS-485, Ethernet, RS-232, wireless links, and/or the like. In one aspect, the external ports may include a SCADA port.

In one or more aspects, the electric power data collection and analysis system 100, the one or more data collection units 102, the data concentrator 150, and/or the like may include embedded technology to control cell modems, satellite modems, process data from external ports, interface the monitored element 400, interface the cloud-based analytics system 300, perform real-time voltage, current, and power calculations, and/or the like the like.

Figure 5:
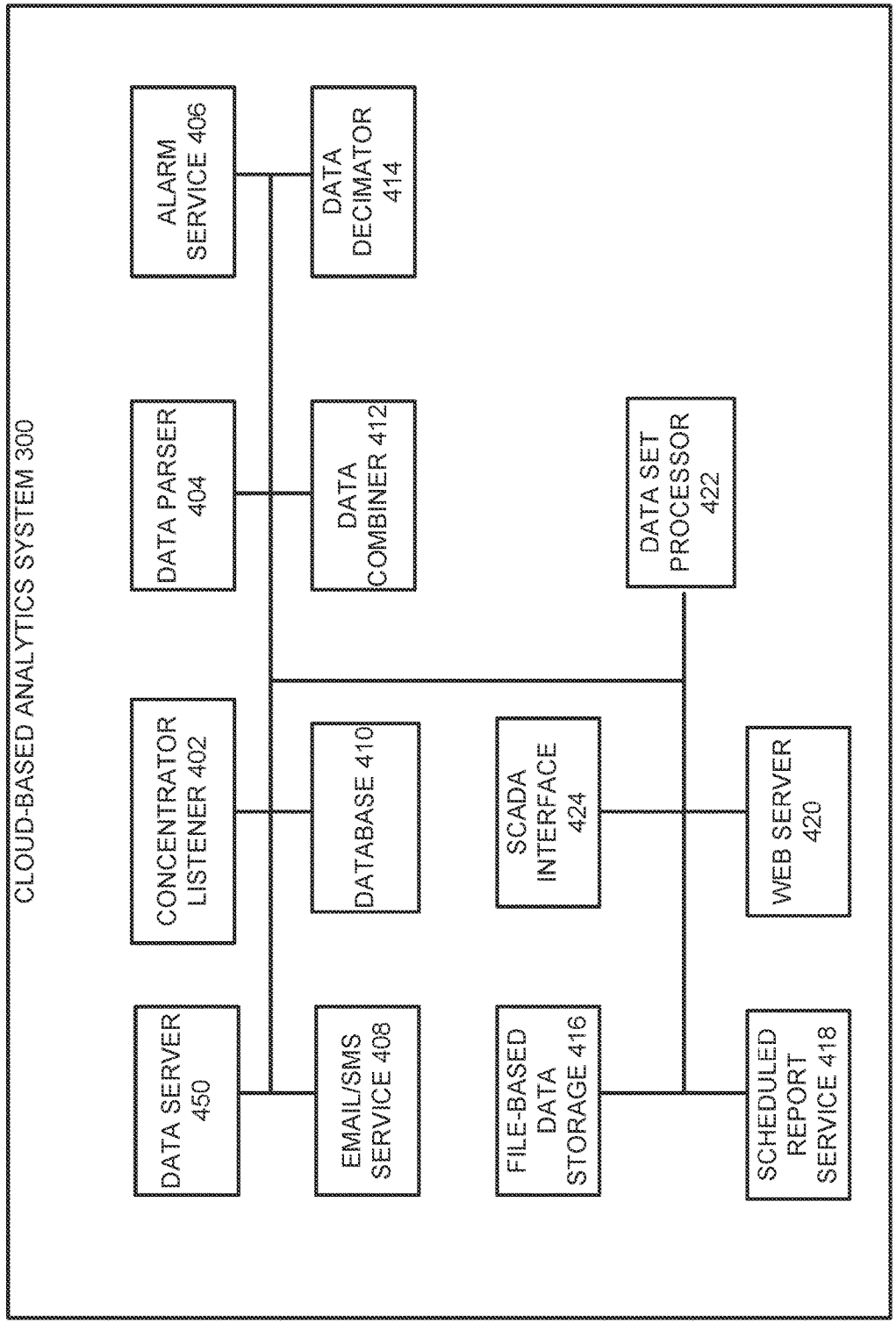
FIG. 5 illustrates an exemplary implementation of a cloud-based server system according to aspects of the disclosure.

FIG. 5 illustrates an exemplary implementation of a cloud-based server system according to aspects of the disclosure.

In particular, FIG. 5 illustrates an exemplary implementation of the cloud-based analytics system 300 that may be implemented as a cloud-based server system, and may be a collection of virtual machines and processes. The cloud-based analytics system 300 may be configured perform several functions: receive and parse data from one or more implementations of the electric power data collection and analysis system 100 as it streams in to the cloud-based analytics system 300; store all measured values as sent from the electric power data collection and analysis system 100; process any alerts from the electric power data collection and analysis system 100, including sending immediate message notices, such as email notices, text message notices, application based notices, and/or the like, to any triggered distribution list; provides a map-based graphical display of all the electric power data collection and analysis system 100 associated with a specific account; provide graphical and report-based data analysis tools for the user to view and analyze data; provide a control interface to send commands or query status of the electric power data collection and analysis system 100, or any other compatible device connected to the electric power data collection and analysis system 100 and/or the cloud-based analytics system 300; and/or provide a SCADA system interface to allow an external SCADA master to query information and send commands to the electric power data collection and analysis system 100.

The cloud-based analytics system 300 may further include one or more the following components, a data server 450, a concentrator listener 402, a data parser 404, an alarm service 406, an email/SMS service 408, a database 410, a data combiner 412, a data decimator 414, a file-based data storage 416, a scheduled report service 418, a Web server 420, a data set processor 422, a SCADA interface 424, and/or the like.

The user interaction with the cloud-based analytics system 300 may be through a standard web browser. The cloud-based analytics system 300 may utilize any other similar on-demand cloud computing platforms. An aspect may include a collection of Berkeley Software Distribution (BSD) or Linux-based virtual machine servers, including a server for receiving and parsing incoming packets the electric power data collection and analysis system 100, storing received measurements, processing and sending alert emails and SMS messages, storing device information, user information, account information, billing information, and/or the like in a SQL database, and providing web hosting (e.g. with Apache) for the user web application. In aspects the servers are connected in a private network, with only the web host including a separate, public network interface (to allow web browser connections). The electric power data collection and analysis system 100 may be networked inside a cell carrier private network, with a VPN connection to the data server 450.

The data server 450 may decompress data received from the electric power data collection and analysis system 100 and may store the measurement data. Although the data may be stored in a relational database, an aspect uses a binary file format to store individual packets. A separate combiner process may run in the background, reading the small stored packets and combining them into larger chunks (e.g. into a 24 hour chunk).

A web application hosted by the cloud-based analytics system 300 may present a map-based display of all implementations of the electric power data collection and analysis system 100 in a user's account. The electric power data collection and analysis system 100 may be located at the monitored element 400 manually by the user, or automatically located by using a global navigation satellite system (GNSS) such as GPS, or other positioning information sent by the electric power data collection and analysis system 100. A related heat map may be created from the analyzed data by the cloud-based analytics system 300, the electric power data collection and analysis system 100, and/or the like to show detected or predicted problem areas graphically overload on a geographic map of the area. Utility-supplied GIS (Graphical Information system) data with the location of utility assets and historical problem locations may be overlaid or combined with the analyzed data on a heat map.

The web page may be used to request the generation of reports in various formats (HTML, CSV, PDF, etc.) These reports may be raw measurements from one or more implementations of the electric power data collection and analysis system 100, alert history, account billing information, etc. The reports may be rendered immediately and presented to the user in the browser, or configured to be emailed on a scheduled basis.

The cloud-based analytics system 300 may be configured to present an external interface, to allow a connection to a 3rd party SCADA system or other control system. The external interface may be configured to use a standard SCADA protocol such as DNP, MODBUS over IP, and/or the like and may be configured to present device slave addresses and point maps such that the external SCADA system may poll or send commands to the cloud-based analytics system 300. The electric power data collection and analysis system 100 and/or the cloud-based analytics system 300 may parse SCADA messages, responding as needed. These commands and queries may be for data stored on the cloud-based analytics system 300, or require the cloud-based analytics system 300 to issue commands to various implementations of the electric power data collection and analysis system 100. For example, an operator may send a SCADA command to operate a component of the monitored element 400 from an outside system. This command may be received by the cloud-based analytics system 300, processed, and relayed to the electric power data collection and analysis system 100.

Figure 6:
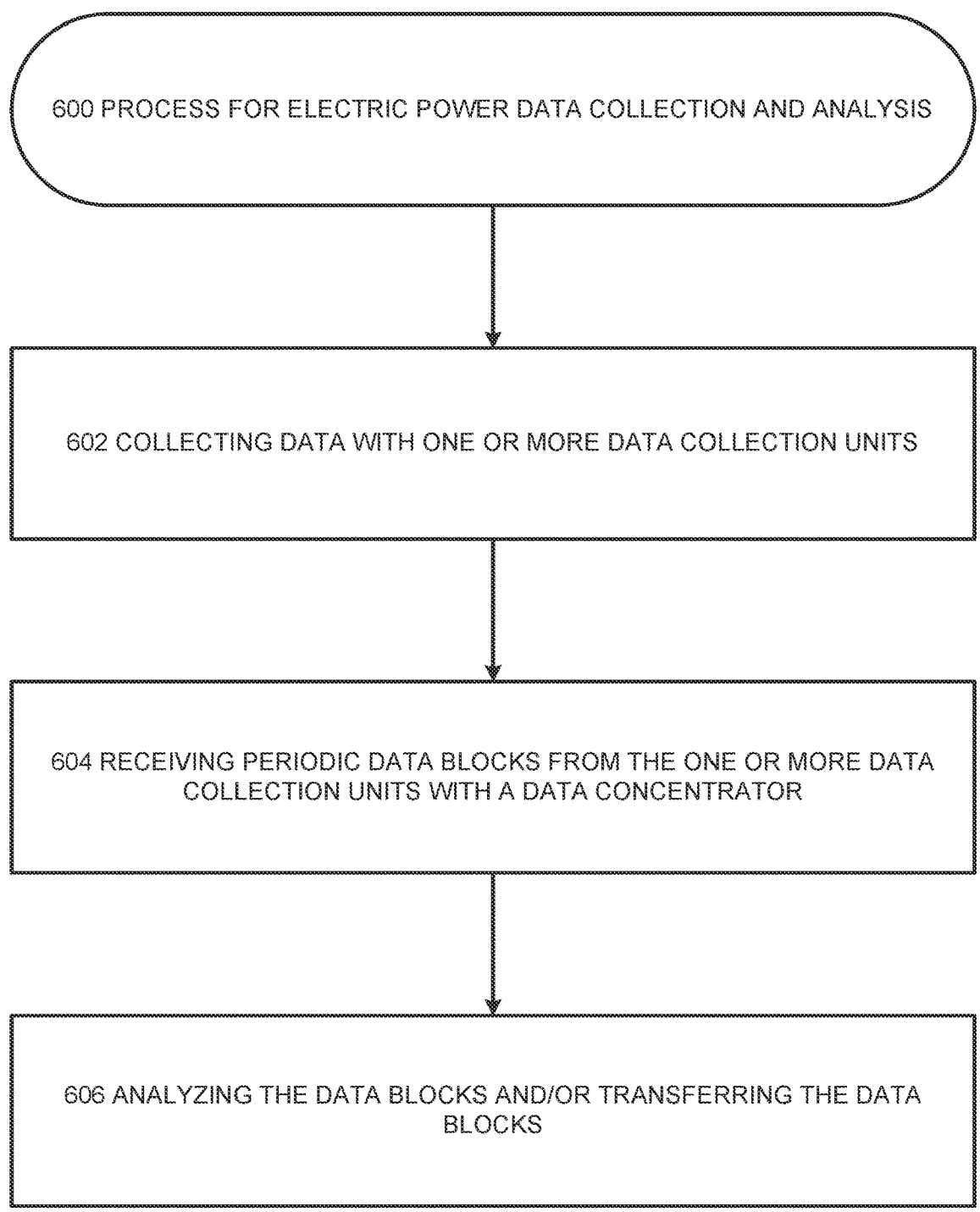
FIG. 6 illustrates a process for electric power data collection and analysis according to aspects of the disclosure.

FIG. 6 illustrates a process for electric power data collection and analysis according to aspects of the disclosure.

In particular, FIG. 6 illustrates a process for electric power data collection and analysis 600 which may include any one or more the features described herein. The process for electric power data collection and analysis 600 may be implemented by any component of the electric power data collection and analysis system 100. The process for electric power data collection and analysis 600 may be implemented by software.

The process for electric power data collection and analysis 600 may include collecting data with one or more data collection units 602. In particular, the collecting data with one or more data collection units 602 may include collecting data as described herein by the one or more data collection units 102. For example, the collecting data with one or more data collection units 602 may include receiving an analog signal (line voltage, current, or the like), conditioning the signal, digitizing the signal, calculating a measurement of various factors (RMS, total harmonic distortion (THD), etc.), applying an averaging and conditioning of the measurement, and/or the like.

The process for electric power data collection and analysis 600 may include receiving periodic data blocks from the one or more data collection units with a data concentrator 604. In particular, the receiving periodic data blocks from the one or more data collection units with a data concentrator 604 may include receiving periodic data blocks from the one or more data collection units 102 with the data concentrator 150 as described herein.

The process for electric power data collection and analysis 600 may include analyzing the data blocks and/or transferring the data blocks 606. In particular, the analyzing the data blocks and/or transferring the data blocks 606 may include any of the analysis of the data blocks or transfer of the data blocks as described herein. For example, the analyzing the data blocks and/or transferring the data blocks 606 may include determining whether a trigger is met. If the trigger is met (yes), then analyzing the data blocks and/or transferring the data blocks 606 may send message to the cloud-based analytics system 300 or one or more other components as described herein.

Accordingly, the disclosure has disclosed solutions for providing a novel data acquisition and collection device, system, and/or process coupled with optional cloud-based data collection and analysis features. The disclosed device, system, and/or process provides for the collection of large datasets from the electric power grid to feed into ML training systems, AI training systems, and/or the like and optionally provides a mechanism to apply new algorithms back to the disclosed device, system, and/or process to enhance data collection and triggering mechanisms.

The following are a number of nonlimiting EXAMPLES of aspects of the disclosure.

One EXAMPLE includes: EXAMPLE 1. An apparatus for electric power data collection and analysis includes: at least one transducer configured to measure an electrical parameter of a monitored element; one or more data collection units configured to collect data that includes at least the electrical parameter measured by the at least one transducer; and a data concentrator configured to receive periodic data blocks from the one or more data collection units that includes the data collected by the one or more data collection units, where the electrical parameter includes at least one of the following: voltage, current, and/or power.

The above-noted EXAMPLE may further include any one or a combination of more than one of the following EXAMPLES: 2. The apparatus for electric power data collection and analysis of any EXAMPLE herein, where: the one or more data collection units includes an analog to digital sampling system; and the at least one transducer includes at least one of the following: a voltage transducer and/or a current transducer. 3. The apparatus for electric power data collection and analysis of any EXAMPLE herein, where: the one or more data collection units includes a digital signal processor configured for data collection, pre-processing, and analytic operations; and where the one or more data collection units includes a second processor configured for data buffering and communication. 4. The apparatus for electric power data collection and analysis of any EXAMPLE herein, where the one or more data collection units includes at least one processor configured for data collection, pre-processing, analytic operations, data buffering, and communication. 5. The apparatus for electric power data collection and analysis of any EXAMPLE herein, where the data concentrator is configured to receive raw waveform and other data from the one or more data collection units; where the data concentrator is configured to provide timestamps; where the data concentrator is configured to compress the data in a format suitable for storage; and where the data concentrator is configured to store the data in an organized fashion for later retrieval. 6. The apparatus for electric power data collection and analysis of any EXAMPLE herein, where the data concentrator is configured to send the data through a network to a data lake or cloud-based analytics system. 7. The apparatus for electric power data collection and analysis of any EXAMPLE herein, where the data concentrator is configured to accumulate data locally in a compressed format; and where the data concentrator is configured to periodically transfer the data to a removable storage device if the data concentrator is not connected to a network. 8. The apparatus for electric power data collection and analysis of any EXAMPLE herein, where the one or more data collection units are further configured to collect the data from the monitored element that includes at least one of the following: information associated with the monitored element, data associated with the monitored element, and measurements associated with the monitored element. 9. The apparatus for electric power data collection and analysis of any EXAMPLE herein, where the data concentrator is configured to process the data blocks from the one or more data collection units for implementation in one of the following: a machine learning system and/or an artificial intelligence system. 10. The apparatus for electric power data collection and analysis of any EXAMPLE herein, where the monitored element includes at least one of the following: an electrical substation, a solar farm, a wind farm, a Distributed Energy Resource (DER), a portion of a utility transmission infrastructure, a portion of a utility generation infrastructure, one or more circuits, one or more machines, and/or one or more components.

One EXAMPLE includes: EXAMPLE 11. A process for electric power data collection and analysis includes: measuring an electrical parameter of a monitored element with at least one transducer; collecting data with one or more data collection units that includes at least the electrical parameter measured by the at least one transducer; and receiving periodic data blocks from the one or more data collection units with a data concentrator that includes the data collected by the one or more data collection units, where the electrical parameter includes at least one of the following: voltage, current, and/or power.

The above-noted EXAMPLE may further include any one or a combination of more than one of the following EXAMPLES: 12. The process for electric power data collection and analysis of any EXAMPLE herein, where: the one or more data collection units includes an analog to digital sampling system; and the at least one transducer includes at least one of the following: a voltage transducer and/or a current transducer. 13. The process for electric power data collection and analysis of any EXAMPLE herein, where; the one or more data collection units includes a digital signal processor for data collection, pre-processing, and analytic operations; and where the one or more data collection units includes a second processor configured for data buffering and communication. 14. The process for electric power data collection and analysis of any EXAMPLE herein, where the one or more data collection units includes at least one processor configured for data collection, pre-processing, analytic operations, data buffering, and communication. 15. The process for electric power data collection and analysis of any EXAMPLE herein, where the data concentrator is configured to receive raw waveform and other data from the one or more data collection units; where the data concentrator is configured to provide timestamps; where the data concentrator is configured to compress the data in a format suitable for storage; and where the data concentrator is configured to store the data in an organized fashion for later retrieval. 16. The process for electric power data collection and analysis of any EXAMPLE herein, where the data concentrator configured to send the data through a network to a data lake or cloud-based analytics system. 17. The process for electric power data collection and analysis of any EXAMPLE herein, where the one or more data collection units includes a digital signal processor configured for data collection, pre-processing, and analytic operations. 18. The process for electric power data collection and analysis of any EXAMPLE herein, where the one or more data collection units are further configured to collect the data from the monitored element that includes at least one of the following: information associated with the monitored element, data associated with the monitored element, and measurements associated with the monitored element. 19. The process for electric power data collection and analysis of any EXAMPLE herein, where the data concentrator is configured to process the data blocks from the one or more data collection units for implementation in one of the following: a machine learning system and/or an artificial intelligence system. 20. The process for electric power data collection and analysis of any EXAMPLE herein, where the monitored element includes at least one of the following: an electrical substation, a solar farm, a wind farm, a Distributed Energy Resource (DER), a portion of a utility transmission infrastructure, a portion of a utility generation infrastructure, one or more circuits, one or more machines, and/or one or more components.

The artificial intelligence and/or machine learning may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and the like.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term text message or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages and ringtones. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

In an aspect, the disclosure may be web-based. For example, a server may operate a web application to allow the disclosure to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An apparatus for electric power data collection and analysis comprising:
    at least one transducer configured to measure an electrical parameter of a monitored element;
    at least one environment sensor configured to measure an environment of the monitored element and generate environment measurements;
    one or more data collection units configured to collect data that comprises at least the electrical parameter measured by the at least one transducer and the environment measurements of the monitored element measured by the at least one environment sensor;
    a processor implemented as a digital signal processor configured for data collection, pre-processing, and/or analytic operations; and
    a data concentrator configured to receive periodic data blocks from the one or more data collection units that comprises the data collected by the one or more data collection units,
    wherein the electrical parameter comprises at least one of the following: voltage, current, and/or power;
    wherein the processor is configured to provide power quality monitoring that comprises power quality metrics including flicker and harmonic measurements;
    wherein the at least one environment sensor comprises at least one of a temperature sensor configured to measure an ambient temperature of the monitored element, an air pressure sensor configured to measure an ambient air pressure of the monitored element, a humidity sensor configured to measure an ambient humidity of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element;
    wherein the monitored element comprises at least one of the following: an electrical substation, a solar farm, a wind farm, a Distributed Energy Resource (DER), a portion of a utility transmission infrastructure, a portion of a utility generation infrastructure, one or more circuits, one or more machines, and/or one or more components; and
    wherein:
    the one or more data collection units comprise an analog to digital converter implemented in a sampling system;
    the one or more data collection units comprise a second processor configured for data buffering and communication of the electrical parameter measured by the at least one transducer and the environment measurements of the monitored element measured by the at least one environment sensor;
    the sampling system is configured to implement oversampling at a first frequency and a first resolution;
    the sampling system is further configured to output the oversampling to the second processor;
    the second processor is further configured to receive the oversampling from the sampling system and down sample the output to a second frequency and a second resolution, the second frequency being lower than the first frequency, and the second resolution being greater than the first resolution;
    and the at least one transducer comprises at least one of the following: a voltage transducer and/or a current transducer.

2. The apparatus for electric power data collection and analysis of claim 1,
    wherein the one or more data collection units comprise a second processor configured for data buffering and communication of the electrical parameter measured by the at least one transducer and the environment measurements of the monitored element measured by the at least one environment sensor; and
    wherein the second processor is configured to compute derivative signals comprising at least phasor measurement unit (PMU) data.

3. The apparatus for electric power data collection and analysis of claim 1, further comprising a cloud-based analytics system, wherein the data concentrator is configured to receive raw waveform and other data from the one or more data collection units;

wherein the data concentrator is configured to provide timestamps;

wherein the data concentrator is configured to send the data on a communication channel through a network to the cloud-based analytics system;

wherein the cloud-based analytics system is implemented as a cloud-based server system;

wherein the cloud-based analytics system comprises a SCADA interface and is connected to a SCADA system through the SCADA interface;

wherein the cloud-based analytics system is configured to operate as a SCADA remote terminal unit (RTU) to make data available to a SCADA master;

wherein the data comprises at least the electrical parameter measured by the at least one transducer and the environment measurements of the monitored element measured by the at least one environment sensor; and wherein the data is configured to assist in training algorithms for one of the following: a machine learning system and/or an artificial intelligence system.

4. The apparatus for electric power data collection and analysis of claim 1, wherein the one or more data collection units comprise an analog to digital converter implemented in a sampling system;

wherein the one or more data collection units comprise a second processor configured for data buffering and communication of the electrical parameter measured by the at least one transducer and the environment measurements of the monitored element measured by the at least one environment sensor;

wherein the sampling system is configured to implement oversampling at a first frequency and a first resolution;

wherein the sampling system is further configured to output the oversampling to the second processor;

wherein the second processor is further configured to receive the oversampling from the sampling system and down sample the output to a second frequency and a second resolution, the second frequency being lower than the first frequency, and the second resolution being greater than the first resolution;

wherein the data concentrator is configured to accumulate data locally in a compressed format;

wherein the data concentrator is configured to periodically transfer the data to a removable storage device if the data concentrator is not connected to a network; and wherein the data comprises at least the electrical parameter measured by the at least one transducer and the environment measurements of the monitored element measured by the at least one environment sensor.

5. The apparatus for electric power data collection and analysis of claim 1, further comprising a cloud-based analytics system, wherein the data concentrator is configured to receive raw waveform and other data from the one or more data collection units;

wherein the data concentrator is configured to provide timestamps;

wherein the data concentrator is configured to send the data on a communication channel through a network to the cloud-based analytics system;

wherein the cloud-based analytics system is implemented as a cloud-based server system;

wherein the cloud-based analytics system comprises a SCADA interface and is connected to a SCADA system through the SCADA interface;

wherein the cloud-based analytics system is configured to operate as a SCADA remote terminal unit (RTU) to make data available to a SCADA master;

wherein the one or more data collection units are further configured to collect the data from the monitored element that comprises at least one of the following: information associated with the monitored element, data associated with the monitored element, and measurements associated with the monitored element; and wherein the at least one environment sensor comprises at least one of an air pressure sensor configured to measure an ambient air pressure of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element.

6. The apparatus for electric power data collection and analysis of claim 4, wherein the one or more data collection units comprise a second processor configured for data buffering and communication of the electrical parameter measured by the at least one transducer and the environment measurements of the monitored element measured by the at least one environment sensor;

wherein the one or more data collection units comprise an analog to digital converter implemented in a sampling system;

wherein the sampling system is configured to implement oversampling at a first frequency and a first resolution;

wherein the sampling system is further configured to output the oversampling to the second processor;

wherein the second processor is further configured to receive the oversampling from the sampling system and down sample the output to a second frequency and a second resolution, the second frequency being lower than the first frequency, and the second resolution being greater than the first resolution;

wherein the data concentrator is configured to process the periodic data blocks from the one or more data collection units for implementation in one of the following: a machine learning system and/or an artificial intelligence system;

wherein the periodic data blocks comprise the data that includes at least the electrical parameter measured by the at least one transducer and the environment measurements of the monitored element measured by the at least one environment sensor; and wherein the periodic data blocks are configured to assist in training algorithms for one of the following: the machine learning system and/or the artificial intelligence system.

7. An apparatus for electric power data collection and analysis comprising:

at least one transducer configured to measure an electrical parameter of a monitored element;

at least one environment sensor configured to measure an environment of the monitored element and generate environment measurements;

one or more data collection units configured to collect data that comprises at least the electrical parameter measured by the at least one transducer and the environment measurements of the monitored element measured by the at least one environment sensor;
a processor implemented as a digital signal processor configured for data collection, pre-processing, and/or analytic operations; and
a data concentrator configured to receive periodic data blocks from the one or more data collection units that comprises the data collected by the one or more data collection units,
wherein the processor is configured to provide power quality monitoring that comprises power quality metrics including flicker and harmonic measurements;
wherein the electrical parameter comprises at least one of the following: voltage, current, and/or power;
wherein the at least one environment sensor comprises at least one of a temperature sensor configured to measure an ambient temperature of the monitored element, an air pressure sensor configured to measure an ambient air pressure of the monitored element, a humidity sensor configured to measure an ambient humidity of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element,
wherein the one or more data collection units comprise a digital signal processor configured for data collection, pre-processing, and analytic operations of the electrical parameter measured by the at least one transducer and the environment measurements of the monitored element measured by the at least one environment sensor;
wherein the one or more data collection units comprise a second processor configured for data buffering and communication of the electrical parameter measured by the at least one transducer and the environment measurements of the monitored element measured by the at least one environment sensor;
wherein the processor is configured to receive data from the second processor over a bus;
wherein the processor is configured to transfer the data to the data concentrator;
wherein the one or more data collection units comprise an analog to digital converter implemented in a sampling system;
wherein the one or more data collection units comprise a second processor configured for data buffering and communication of the electrical parameter measured by the at least one transducer and the environment measurements of the monitored element measured by the at least one environment sensor;
wherein the sampling system is configured to implement oversampling at a first frequency and a first resolution;
wherein the sampling system is further configured to output the oversampling to the second processor;
wherein the second processor is further configured to receive the oversampling from the sampling system and down sample the output to a second frequency and a second resolution, the second frequency being lower than the first frequency, and the second resolution being greater than the first resolution;
wherein the data concentrator is configured to accumulate data locally in a compressed format;
wherein the data concentrator is configured to periodically transfer the data to a removable storage device if the data concentrator is not connected to a network; and
wherein the data comprises at least the electrical parameter measured by the at least one transducer and the environment measurements of the monitored element measured by the at least one environment sensor.

8. An apparatus for electric power data collection and analysis comprising:
at least one transducer configured to measure an electrical parameter of a monitored element;
at least one environment sensor configured to measure an environment of the monitored element and generate environment measurements;
one or more data collection units configured to collect data that comprises at least the electrical parameter measured by the at least one transducer and the environment measurements of the monitored element measured by the at least one environment sensor;
a processor implemented as a digital signal processor configured for data collection, pre-processing, and/or analytic operations; and
a data concentrator configured to receive periodic data blocks from the one or more data collection units that comprises the data collected by the one or more data collection units,
wherein the electrical parameter comprises at least one of the following: voltage, current, and/or power;
wherein the processor is configured to provide power quality monitoring that comprises power quality metrics including flicker and harmonic measurements;
wherein the at least one environment sensor comprises at least one of a temperature sensor configured to measure an ambient temperature of the monitored element, an air pressure sensor configured to measure an ambient air pressure of the monitored element, a humidity sensor configured to measure an ambient humidity of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element;
wherein the monitored element comprises at least one of the following: an electrical substation, a solar farm, a wind farm, a Distributed Energy Resource (DER), a portion of a utility transmission infrastructure, a portion of a utility generation infrastructure, one or more circuits, one or more machines, and/or one or more components;
wherein the one or more data collection units comprise a second processor configured for data buffering and communication of the electrical parameter measured by the at least one transducer and the environment measurements of the monitored element measured by the at least one environment sensor;
wherein the one or more data collection units comprise an analog to digital converter implemented in a sampling system;
wherein the sampling system is configured to implement oversampling at a first frequency and a first resolution;
wherein the sampling system is further configured to output the oversampling to the second processor;
wherein the second processor is further configured to receive the oversampling from the sampling system and down sample the output to a second frequency and a second resolution, the second frequency being lower than the first frequency, and the second resolution being greater than the first resolution;

wherein the data concentrator is configured to receive raw waveform and other data from the one or more data collection units;

wherein the data concentrator is configured to provide timestamps;

wherein the data concentrator is configured to compress the data in a format suitable for storage;

wherein the data concentrator is configured to store the data in an organized fashion in a removable storage device for later retrieval; and wherein the data comprises at least the electrical parameter measured by the at least one transducer and the environment measurements of the monitored element measured by the at least one environment sensor.

9. A process for electric power data collection and analysis comprising:

measuring an electrical parameter of a monitored element with at least one transducer;

measuring an environment of the monitored element with at least one environment sensor and generating environment measurements;

collecting data with one or more data collection units that comprises at least the electrical parameter measured by the at least one transducer and the environment measurements of the monitored element measured by the at least one environment sensor; and receiving periodic data blocks from the one or more data collection units with a data concentrator that comprises the data collected by the one or more data collection units, wherein the electrical parameter comprises at least one of the following: voltage, current, and/or power;

wherein the at least one environment sensor comprises at least one of a temperature sensor configured to measure an ambient temperature of the monitored element, an air pressure sensor configured to measure an ambient air pressure of the monitored element, a humidity sensor configured to measure an ambient humidity of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element;

wherein the one or more data collection units comprise a digital signal processor for data collection, pre-processing, and analytic operations of the electrical parameter measured by the at least one transducer and the environment measurements of the monitored element measured by the at least one environment sensor;

wherein the digital signal processor is configured to provide power quality monitoring that comprises power quality metrics including flicker and harmonic measurements;

wherein the one or more data collection units comprise a second processor configured for data buffering and communication of the electrical parameter measured by the at least one transducer and the environment measurements of the monitored element measured by the at least one environment sensor; and wherein:

the one or more data collection units comprise an analog to digital sampling system;

the sampling system is configured to implement oversampling at a first frequency and a first resolution;

the sampling system is further configured to output the oversampling to the second processor;

the second processor is further configured to receive the oversampling from the sampling system and down sample the output to a second frequency and a second resolution, the second frequency being lower than the first frequency, and the second resolution being greater than the first resolution; and the at least one transducer comprises at least one of the following: a voltage transducer and/or a current transducer.

10. The process for electric power data collection and analysis of claim 9, wherein the second processor is configured to compute derivative signals comprising at least phasor measurement unit (PMU) data the one or more data collection units comprise at least one processor configured for data collection, pre-processing, analytic operations, data buffering, and communication of the electrical parameter measured by the at least one transducer and the environment measurements of the monitored element measured by the at least one environment sensor.

11. The process for electric power data collection and analysis of claim 9, further comprising implementing a cloud-based analytics system, wherein the data concentrator is configured to receive raw waveform and other data from the one or more data collection units;

wherein the data concentrator is configured to provide timestamps;

wherein the data concentrator is configured to send the data through a network to the cloud-based analytics system;

wherein the cloud-based analytics system is implemented as a cloud-based server system;

wherein the cloud-based analytics system comprises a SCADA interface and is connected to a SCADA system through the SCADA interface;

wherein the cloud-based analytics system is configured to operate as a SCADA remote terminal unit (RTU) to make data available to a SCADA master;

wherein the data comprises at least the electrical parameter measured by the at least one transducer and the environment measurements of the monitored element measured by the at least one environment sensor; and wherein the data is configured to assist in training algorithms for one of the following: a machine learning system and/or an artificial intelligence system.

12. A process for electric power data collection and analysis comprising:

measuring an electrical parameter of a monitored element with at least one transducer;

measuring an environment of the monitored element with at least one environment sensor and generating environment measurements;

collecting data with one or more data collection units that comprises at least the electrical parameter measured by the at least one transducer and the environment measurements of the monitored element measured by the at least one environment sensor; and receiving periodic data blocks from the one or more data collection units with a data concentrator that comprises the data collected by the one or more data collection units, wherein the electrical parameter comprises at least one of the following: voltage, current, and/or power;

wherein the at least one environment sensor comprises at least one of a temperature sensor configured to measure an ambient temperature of the monitored element, an air pressure sensor configured to measure an ambient air pressure of the monitored element, a humidity sensor configured to measure an ambient humidity of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element;

wherein the one or more data collection units comprise a digital signal processor for data collection, pre-processing, and analytic operations of the electrical parameter measured by the at least one transducer and the environment measurements of the monitored element measured by the at least one environment sensor;

wherein the digital signal processor is configured to provide power quality monitoring that comprises power quality metrics including flicker and harmonic measurements;

wherein the one or more data collection units comprise a second processor configured for data buffering and communication of the electrical parameter measured by the at least one transducer and the environment measurements of the monitored element measured by the at least one environment sensor;

wherein the one or more data collection units comprise an analog to digital converter implemented in a sampling system;

wherein the sampling system is configured to implement oversampling at a first frequency and a first resolution;

wherein the sampling system is further configured to output the oversampling to the second processor;

wherein the second processor is further configured to receive the oversampling from the sampling system and down sample the output to a second frequency and a second resolution, the second frequency being lower than the first frequency, and the second resolution being greater than the first resolution;

wherein the data concentrator is configured to receive raw waveform and other data from the one or more data collection units;

wherein the data concentrator is configured to provide timestamps;

wherein the data concentrator is configured to compress the data in a format suitable for storage;

wherein the data concentrator is configured to store the data in an organized fashion for later retrieval; and wherein the data comprises at least the electrical parameter measured by the at least one transducer and the environment measurements of the monitored element measured by the at least one environment sensor.

13. A process for electric power data collection and analysis comprising:

measuring an electrical parameter of a monitored element with at least one transducer;

measuring an environment of the monitored element with at least one environment sensor and generating environment measurements;

collecting data with one or more data collection units that comprises at least the electrical parameter measured by the at least one transducer and the environment measurements of the monitored element measured by the at least one environment sensor; and receiving periodic data blocks from the one or more data collection units with a data concentrator that comprises the data collected by the one or more data collection units, wherein the electrical parameter comprises at least one of the following: voltage, current, and/or power;

wherein the at least one environment sensor comprises at least one of a temperature sensor configured to measure an ambient temperature of the monitored element, an air pressure sensor configured to measure an ambient air pressure of the monitored element, a humidity sensor configured to measure an ambient humidity of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element;

wherein the one or more data collection units comprise a digital signal processor for data collection, pre-processing, and analytic operations of the electrical parameter measured by the at least one transducer and the environment measurements of the monitored element measured by the at least one environment sensor;

wherein the digital signal processor is configured to provide power quality monitoring that comprises power quality metrics including flicker and harmonic measurements;

wherein the one or more data collection units comprise a second processor configured for data buffering and communication of the electrical parameter measured by the at least one transducer and the environment measurements of the monitored element measured by the at least one environment sensor;

wherein the one or more data collection units comprise an analog to digital converter implemented in a sampling system;

wherein the sampling system is configured to implement oversampling at a first frequency and a first resolution;

wherein the sampling system is further configured to output the oversampling to the second processor;

wherein the second processor is further configured to receive the oversampling from the sampling system and down sample the output to a second frequency and a second resolution, the second frequency being lower than the first frequency, and the second resolution being greater than the first resolution; and wherein the data comprises at least the electrical parameter measured by the at least one transducer and the environment measurements of the monitored element measured by the at least one environment sensor.

14. A process for electric power data collection and analysis comprising:

measuring an electrical parameter of a monitored element with at least one transducer;

measuring an environment of the monitored element with at least one environment sensor and generating environment measurements;

collecting data with one or more data collection units that comprises at least the electrical parameter measured by the at least one transducer and the environment measurements of the monitored element measured by the at least one environment sensor; and receiving periodic data blocks from the one or more data collection units with a data concentrator that comprises the data collected by the one or more data collection units, wherein the electrical parameter comprises at least one of the following: voltage, current, and/or power;

wherein the at least one environment sensor comprises at least one of a temperature sensor configured to measure an ambient temperature of the monitored element, an air pressure sensor configured to measure an ambient air pressure of the monitored element, a humidity sensor configured to measure an ambient humidity of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element;

wherein the one or more data collection units comprise a digital signal processor for data collection, pre-processing, and analytic operations of the electrical parameter measured by the at least one transducer and the environment measurements of the monitored element measured by the at least one environment sensor;

wherein the digital signal processor is configured to provide power quality monitoring that comprises power quality metrics including flicker and harmonic measurements;

wherein the one or more data collection units comprise a second processor configured for data buffering and communication of the electrical parameter measured by the at least one transducer and the environment measurements of the monitored element measured by the at least one environment sensor;

wherein the one or more data collection units comprise an analog to digital converter implemented in a sampling system;

wherein the sampling system is configured to implement oversampling at a first frequency and a first resolution;

wherein the sampling system is further configured to output the oversampling to the second processor;

wherein the second processor is further configured to receive the oversampling from the sampling system and down sample the output to a second frequency and a second resolution, the second frequency being lower than the first frequency, and the second resolution being greater than the first resolution;

wherein the one or more data collection units are further configured to collect the data from the monitored element that comprises at least one of the following: information associated with the monitored element, data associated with the monitored element, and measurements associated with the monitored element; and wherein the at least one environment sensor comprises at least one of an air pressure sensor configured to measure an ambient air pressure of the monitored element, a solar flux sensor configured to measure an ambient solar flux in an environment of the monitored element a rainfall/precipitation sensor configured to measure an ambient rainfall/precipitation in an environment of the monitored element, and/or a vibration sensor configured to measure an ambient vibration of the monitored element.

15. The process for electric power data collection and analysis of claim 14, wherein the second processor is configured to compute derivative signals comprising at least phasor measurement unit (PMU) data;

wherein the data concentrator is configured to process the periodic data blocks from the one or more data collection units for implementation in one of the following: a machine learning system and/or an artificial intelligence system;

wherein the periodic data blocks comprise the data that includes at least the electrical parameter measured by the at least one transducer and the environment measurements of the monitored element measured by the at least one environment sensor; and wherein the periodic data blocks are configured to assist in training algorithms for one of the following: the machine learning system and/or the artificial intelligence system.

16. A process for electric power data collection and analysis comprising:

measuring an electrical parameter of a monitored element with at least one transducer;

measuring an environment of the monitored element with at least one environment sensor and generating environment measurements;

collecting data with one or more data collection units that comprises at least the electrical parameter measured by the at least one transducer and the environment measurements of the monitored element measured by the at least one environment sensor; and receiving periodic data blocks from the one or more data collection units with a data concentrator that comprises the data collected by the one or more data collection units, wherein the electrical parameter comprises at least one of the following: voltage, current, and/or power;

wherein the at least one environment sensor comprises at least one of a temperature sensor configured to measure an ambient temperature of the monitored element, an air pressure sensor configured to measure an ambient air pressure of the monitored element, a humidity sensor configured to measure an ambient humidity of the monitored element, a solar flux sensor configured to measure an ambient solar flux in an environment of the monitored element, a rainfall/precipitation sensor configured to measure an ambient rainfall/precipitation in an environment of the monitored element, and/or a vibration sensor configured to measure an ambient vibration of the monitored element;

wherein the one or more data collection units comprise a digital signal processor for data collection, pre-processing, and analytic operations of the electrical parameter measured by the at least one transducer and the environment measurements of the monitored element measured by the at least one environment sensor;

wherein the digital signal processor is configured to provide power quality monitoring that comprises power quality metrics including flicker and harmonic measurements;

wherein the one or more data collection units comprise a second processor configured for data buffering and communication of the electrical parameter measured by the at least one transducer and the environment measurements of the monitored element measured by the at least one environment sensor;

wherein the one or more data collection units comprise an analog to digital converter implemented in a sampling system;

wherein the sampling system is configured to implement oversampling at a first frequency and a first resolution;

wherein the sampling system is further configured to output the oversampling to the second processor;

wherein the second processor is further configured to receive the oversampling from the sampling system and down sample the output to a second frequency and a second resolution, the second frequency being lower than the first frequency, and the second resolution being greater than the first resolution; and wherein the monitored element comprises at least one of the following: an electrical substation, a solar farm, a wind farm, a Distributed Energy Resource (DER), a portion of a utility transmission infrastructure, a portion of a utility generation infrastructure, one or more circuits, one or more machines, and/or one or more components.

* * * * *